United States Patent [19]

Alberti et al.

[11] Patent Number: 5,823,764
[45] Date of Patent: Oct. 20, 1998

[54] THREE-STAGE LOW NOX BURNER FOR BURNING SOLID, LIQUID AND GASEOUS FUELS

[75] Inventors: Marco Alberti, Milan; Roberto Rizzi, Monza; Marcello Martano, Adelfia; Gennaro De Michele, Pisa; Sergio Ligasacchi, S. Ciuliano Terme, all of Italy

[73] Assignees: Ansaldo Energia S.p.A., Genoa; Enel S.p.A., Rome, both of Italy

[21] Appl. No.: 891,800

[22] Filed: Jul. 15, 1997

[30] Foreign Application Priority Data

Oct. 8, 1996 [EP] European Pat. Off. .............. 96116099

[51] Int. Cl.[6] ..................................................... F23M 9/00
[52] U.S. Cl. .......................... 431/184; 431/183; 431/284; 431/278; 110/262; 110/265; 239/402.5; 239/404
[58] Field of Search ..................................... 431/182–184, 431/284, 278; 110/261, 262, 265; 239/402.5, 404

[56] References Cited

U.S. PATENT DOCUMENTS

| | | |
|---|---|---|
| 3,834,857 | 9/1974 | Hemingway et al. . |
| 3,904,349 | 9/1975 | Peterson et al. . |
| 4,422,389 | 12/1983 | Schroder ................................ 431/184 |
| 5,145,359 | 9/1992 | Ancona et al. . |
| 5,651,320 | 7/1997 | Leisse et al. ............................ 110/265 |
| 5,697,306 | 12/1997 | La Rue ................................... 431/183 |

FOREIGN PATENT DOCUMENTS

| | | |
|---|---|---|
| 0 163 423 A1 | 12/1985 | European Pat. Off. . |
| 0 409 102 A2 | 1/1991 | European Pat. Off. . |
| 0 554 014 A2 | 8/1993 | European Pat. Off. . |
| 0 571 704A2 | 12/1993 | European Pat. Off. . |

*Primary Examiner*—Carroll B. Dority
*Attorney, Agent, or Firm*—Finnegan, Henderson, Farabow, Garrett & Dunner, L.LP.

[57] ABSTRACT

A low NOx burner comprising ducts for the primary (6), secondary (7) and tertiary air (14), arranged coaxially around its longitudinal axis, for supplying of the primary, secondary and tertiary air, respectively, to a combustion chamber (3), means for accumulation of the air (5), means to give vorticity to the primary, secondary and tertiary air (11, 15, 27) installed in the respective ducts, means for supply of fuel (23, 32, 43) arranged within said ducts to inject the fuel into said combustion chamber. The axial swirler for the secondary air (11) is formed by a plurality of blades each of which is made up of a stationary part (11a) and a mobile part (11b) connected to actuator means capable of moving it in an angular direction to give an air outlet angle of between 30° and 60°. The axial swirler for the tertiary air is conical in shape and has fixed blades. On the tertiary air duct a passage (16) is formed for supply of secondary and tertiary air.

11 Claims, 8 Drawing Sheets

THREE-STAGE LOW NOX BURNER FOR BURNING SOLID, LIQUID AND GASEOUS FUELS

FIELD OF THE INVENTION

The present invention relates to the field of solid, liquid and gaseous fuel burners, and in particular relates to a burner providing three-phase combustion to limit the production of nitrogen oxides.

It is a known fact that nitrogen oxides are one of the most important pollutants produced during combustion processes, and are found in exhaust fumes released into the environment by steam generators, thermoelectric power stations and other industrial installations in which fossil fuels are burned. The formation of nitrogen oxides is due in part to the presence of N-compounds in the fuel (chemical NOx) and in part to the atmospheric nitrogen in the combustion air (thermal NOx). The NOx formation during the combustion process is dependent on a number of parameters, among which the main ones are the flame temperature, the time the combustion gasses remain in the high temperature zone and the excess air. More specifically, formation of nitrogen oxides increases as the flame temperature increases, and can be minimized by keeping the peak values under control. A similar effect is produced when the fuel remains in the high temperature zone for a short time and by a reducing atmosphere or an excess of fuel in the ignition area.

From what has been stated above it is clear that a combined control of the above mentioned operating parameters will allow the formation of nitrogen oxides during combustion to be limited. Among the various methods suggested up to now the simplest one for reduction of nitrogen oxides directly in the combustion chamber is the stage combustion method. By suitably dosing of the air and the fuel within the combustion system, it is in fact possible to form an area rich in fuel in the first part of the flame, where pyrolysis processes take place generating chemical compounds and radicals (OH, CN, HCN) capable of reducing nitrogen oxides. This is followed by an area in which the remaining part of the combustion air is injected to complete combustion. This alternation of zones that are rich and poor in fuel can be created both in the combustion chamber as a whole, by operating all the burners in sub-stoichiometric conditions and providing the balance of air required to complete combustion from above the burners through post-combustion air inlets, and also in the flame of a single burner itself, so that this alternation is the concept upon which the design of so called low NOx burners is based.

In low NOx burners of this type (see for example U.S. Pat. No. 3904349 and European patent No. 0280568) the combustion air is divided into three streams, primary, secondary and tertiary, which are fed into the combustion chamber, in a direction coaxial to the supply of fuel, through respective primary, secondary and tertiary ducts. These ducts can comprise oil lances, gas lances, coal dust injection devices, swirlers to adjust the air vorticity and to control combustion aerodynamics, as well as systems for control of the combustion air flow rate and/or exhaust re-circulation.

Another burner of the same type is described in European Patent No. 0452608 to the same Applicants, which is specially designed to burn liquid and gas fuels only, the geometry of which is capable of forming said zones of different composition: a zone rich in fuel within the flame, suitable for the formation of reduction products, and outer zones in which the nitrogen oxides interact with the compounds and the radicals formed in the reduction zone and are reduced to molecular nitrogen.

The air is divided into three streams: the primary air, which is lightly swirled by a series of fixed blades, stabilizes the flame against the burner. The secondary and tertiary streams are controlled by means of axial and radial registers, respectively, so as to ensure a variable ratio between the two momentums, guaranteeing control of the mixture of secondary air and fuel and accelerating the tertiary flow in order to create a large internal re-circulation area. With this burner, after optimization of the combustion system according to the type of fuel used, it has been possible to obtain reductions in NOx emission in the order of 50% as compared with traditional burners.

All the burners currently available on the market differ greatly in terms of design and structure according to the type of fuel used, gas-oil or coal-oil, respectively. In the few cases in which a three-fuel burner has been created, said burner is in any case derived from a coal-oil burner which has been mechanically, but not functionally re-adapted to hold gas lances.

In burners in which it is possible to burn solid fuel in powder form, for example coal dust, the geometry of the air-coal mixture injector nozzle is of primary importance for control of combustion and therefore for the production of NOx. In particular it is necessary to create areas that are poor in oxygen and rich in coal in the ignition area, and furthermore the time that the fuel remains therein must be such as to minimize the production of NOx and unburned substances. Finally, the re-circulation streams around the end of the nozzle must be controlled in order to avoid excessively high temperatures and local fusion phenomena, which would damage the nozzle irreversibly. In a nozzle for solid fuels of a known type manufactured by Foster Wheeler Energy Corporation, a tangential inlet for the air-coal mixture is provided to convey said mixture towards four or more ducts, whose cross-sections converge towards the combustion chamber and which are arranged in correspondence with the outlet into said chamber along an annulus coaxial with the primary air duct. In this way jets of air-coal mixture rich in coal dust are formed. Between each mixture duct and the adjacent one there is a duct with a diverging cross-section, through which air is input into the ignition area, said air being taken up through slots formed on the external shell of the nozzle. Injection of the air through these ducts is necessary in order to prevent the temperature of the nozzle from reaching excessively high temperatures, but it also increases the level of oxygen in the ignition area, with an adverse effect on the reduction of NOx and therefore on the performance of the nozzle.

Finally, it should be noted that if in more recent burners the reduction of NOx emissions is satisfactory, the need for further limitation of these emissions is strongly felt and greatly desired, in view of the increasingly strict regulations adopted by various national jurisdictions to fight atmospheric pollution.

SUMMARY OF THE INVENTION

The main object of the present invention is to provide a burner with a structure suitable for the stage burning of fossil fuels, both solid, liquid and gaseous, in particular using the same construction solution for the secondary and tertiary air registers and adopting special constructive solutions in the primary air duct for injection of the coal dust.

A particular object of the present invention is to provide a burner of the above mentioned type, capable of employing, with the same air register geometry, three different fuels (coal dust, fuel oil, gas, as well as mixtures of fuels and/or emulsions) either simultaneously or in combination.

A further object of the present invention is to provide a burner of the above mentioned type that is capable of guaranteeing improved performance compared to similar known burners, in terms of a further reduction in NOx emissions.

A further object of the present invention is to provide a burner of the above mentioned type in which the load loss is reduced with respect to that of similar known burners, giving, for an equivalent fan thrust, a reduction in the diameter thereof and the ability to house it in existing boiler vents.

A further object of the present invention is to provide a burner of the above mentioned type in which the moving parts subject to setting or movement during operation are reduced to a minimum, thus increasing the reliability of the burner.

The burner according to the present invention comprises ducts for the primary, secondary and tertiary air, arranged coaxially around its longitudinal axis, for supplying primary, secondary and tertiary air, respectively, to a combustion chamber, means for accumulation of the air, means to give vorticity to the primary, secondary and tertiary air installed in the respective ducts, fuel supply means arranged within said ducts to inject the fuel into said combustion chamber. The means for giving vorticity to the secondary air comprise an axial swirler for the secondary air, formed by a plurality of blades each of which is made up of a fixed part and a mobile part connected to actuator means capable of angularly displacing said mobile part to give an air outlet angle of between 300 and 600. The means for giving vorticity to the tertiary air comprise an axial swirler for the tertiary air, in the shape of a cone and with fixed blades, a passage being formed on the tertiary air duct to feed the secondary air and the tertiary air.

BRIEF DESCRIPTION OF THE DRAWINGS

Further characteristics and advantages of the low NOx burner according to the present invention will be apparent from the following description of a preferred embodiment thereof, given merely as a non-limiting example and with reference to the enclosed drawings, in which.

DESCRIPTION OF A PREFERRED EMBODIMENT

Figure 1:
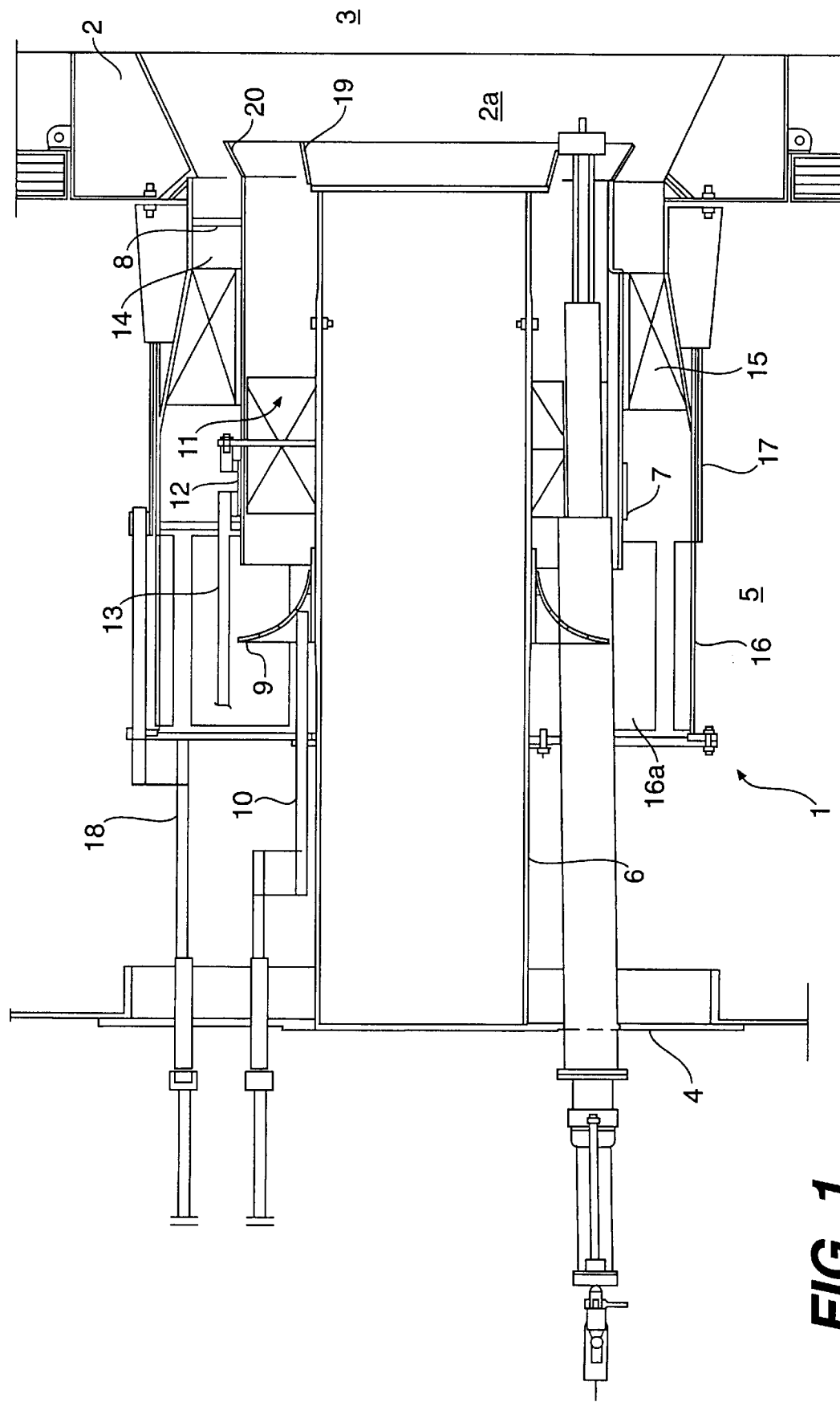
FIG. 1 is a partial longitudinal section view of the burner according to the invention, in which the secondary and tertiary air register assembly is shown.

With reference to FIG. 1, the secondary and tertiary register assembly for a fossil fuel burner is indicated generally with 1, arranged in correspondence with a circular opening 2a in an internal wall 2 of a combustion chamber 3. Opening 2a has the shape of a throat that opens out towards the combustion chamber 3 and the burner extends between internal wall 2 and an external wall 4 forming a windbox 5. A primary air duct, indicated by 6, is also shown, extending from external wall 4 and with its outlet in throat 2a, coaxial to which is a duct 7 for the secondary air, fixed with tie rods 8 to an external and concentric duct 14 for tertiary air. The amount of air supplied to secondary duct 7 is controlled by a disk damper 9 which slides in an axial direction until closing the inlet section of duct 7, and is actuated by a control rod 10. On duct 7 an axial swirler 11 is provided, made up of a fixed portion 11a and a mobile portion 11b capable of determining an angle of outlet for the air of between 30° and 60°.

Figure 5:
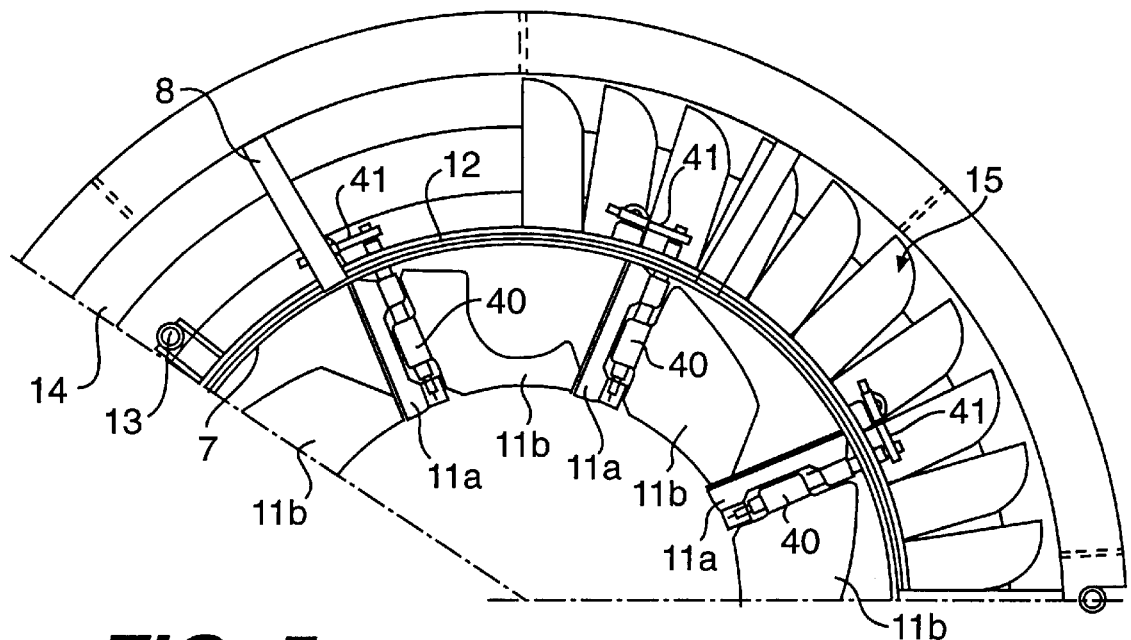
FIGS. 5 and 6 show an axial view and a longitudinal view, respectively, of the system for actuating the secondary air swirler.
Figure 6:
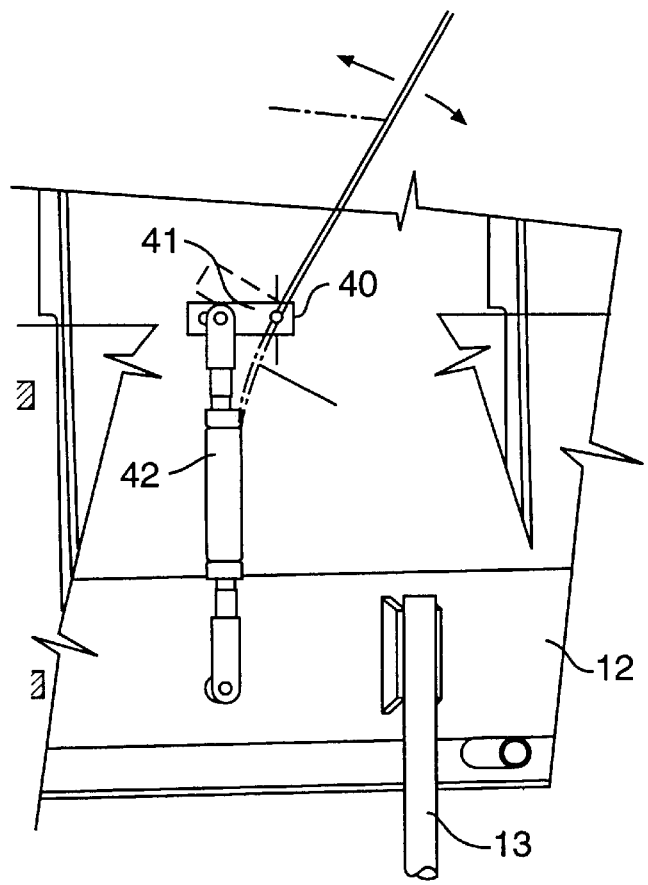

As shown also in greater detail in FIGS. 5 and 6, mobile part 11b of each blade of swirler 11 is connected to fixed portion 11a by means of a hinge 40 integral with an arm 41, pivotally connected to the end of a tie rod 42, that extends in an axial direction from a ring 12 fitted around secondary duct 7 and axially sliding along said duct on activation of a rod 13 integral with ring 12. The control of mobile portion 11b can be either manual or automatic, to control the swirl both on start-up and during operation.

On the outside of secondary duct 7 and fixed to the internal wall 2 a tertiary air duct 14 is provided concentric to secondary duct 7 and comprising a conical axial swirler 15 with fixed blades and with an outlet angle of between 10° and 45°.

On the tertiary air duct 14 a passage 16 is provided, formed by a plurality of slots 16a for general supply of air to the burner. This passage can be fully closed by means of a tubular damper 17 sliding on the outside of the tertiary duct 14, by actuating a rod 18.

A flow divider 19 having the shape of a diverging truncated cone with a suitable angle of inclination, preferably between 0° and 30°, extends from the end of primary duct 6 in throat 2a extends for separating the primary air stream from the secondary air stream. A similar flow divider 20 extends from the end of secondary duct 7 coming into throat 2a for separating the secondary air stream from the tertiary air stream, and has the shape of a diverging truncated cone with an angle in the range of from 30° to 60°, optionally adjustable by means of conventional lever devices, not shown, in order to adjust the outlet speed of the tertiary air and its partition with the other air streams.

The secondary and tertiary air register structure described above gives the following advantages, with respect to burners currently available on the market, and more specifically with respect to the burner according to European Patent 0452608 in the name of the same Applicants:

a significant reduction in the pressure drop, resulting from the axial arrangement of the tertiary air intake and the low level of swirl at the outlet;

greater simplicity of construction, resulting from the elimination of the mobile blades in the tertiary air section and the consequent removal of the relative actuation devices thereof;

easy balance of the air stream through the single burners in case of applications with a common windbox, by actuation of register 17, which controls the flow rate of air to the burner;

optimization of the aerodynamic profile of the burner, which creates and stabilizes an extensive area of recirculation in the first part of the flame, giving further reductions in the level of NOx produced.

Figure 2:
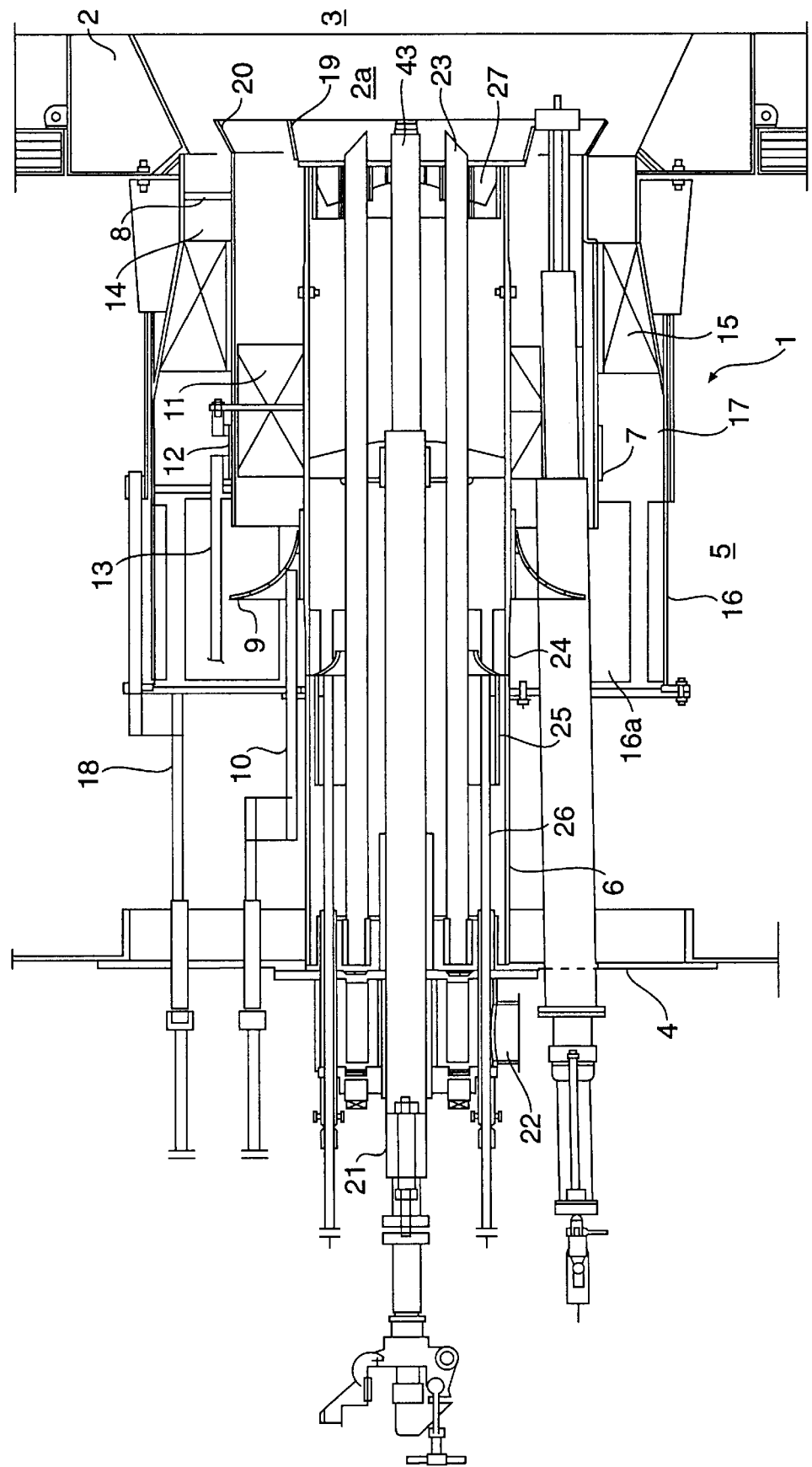
FIG. 2 is a longitudinal section view of the oil-gas version of the burner according to the invention.

An embodiment of the structure of the secondary and tertiary air register assembly according to the invention is illustrated in FIG. 2 for a oil-gas burner. In FIG. 2 the components that are the same as those illustrated in the burner of FIG. 1 also have the same reference numbers.

Along the longitudinal axis of the burner a tubular guide 21 is provided for a liquid fuel lance 43 and a supply duct 22 for gaseous fuel distributed on equally spaced lances 23 arranged around the one for the liquid fuel. Lances 23 for the gaseous fuel and the one for the liquid fuel are arranged within the cylindrical duct for primary air 6 and lances 23 are supported by intermediate tie rods 21a extending radially from tubular guide 21. Along an intermediate circumferential portion of duct 6 a plurality of slots 24 are formed to supply it with primary air. Slots 24 can be intercepted until completely closed by means of a cylindrical damper 25 coaxial with the duct 6 and sliding along it by means of a control rod 26.

Figure 7:
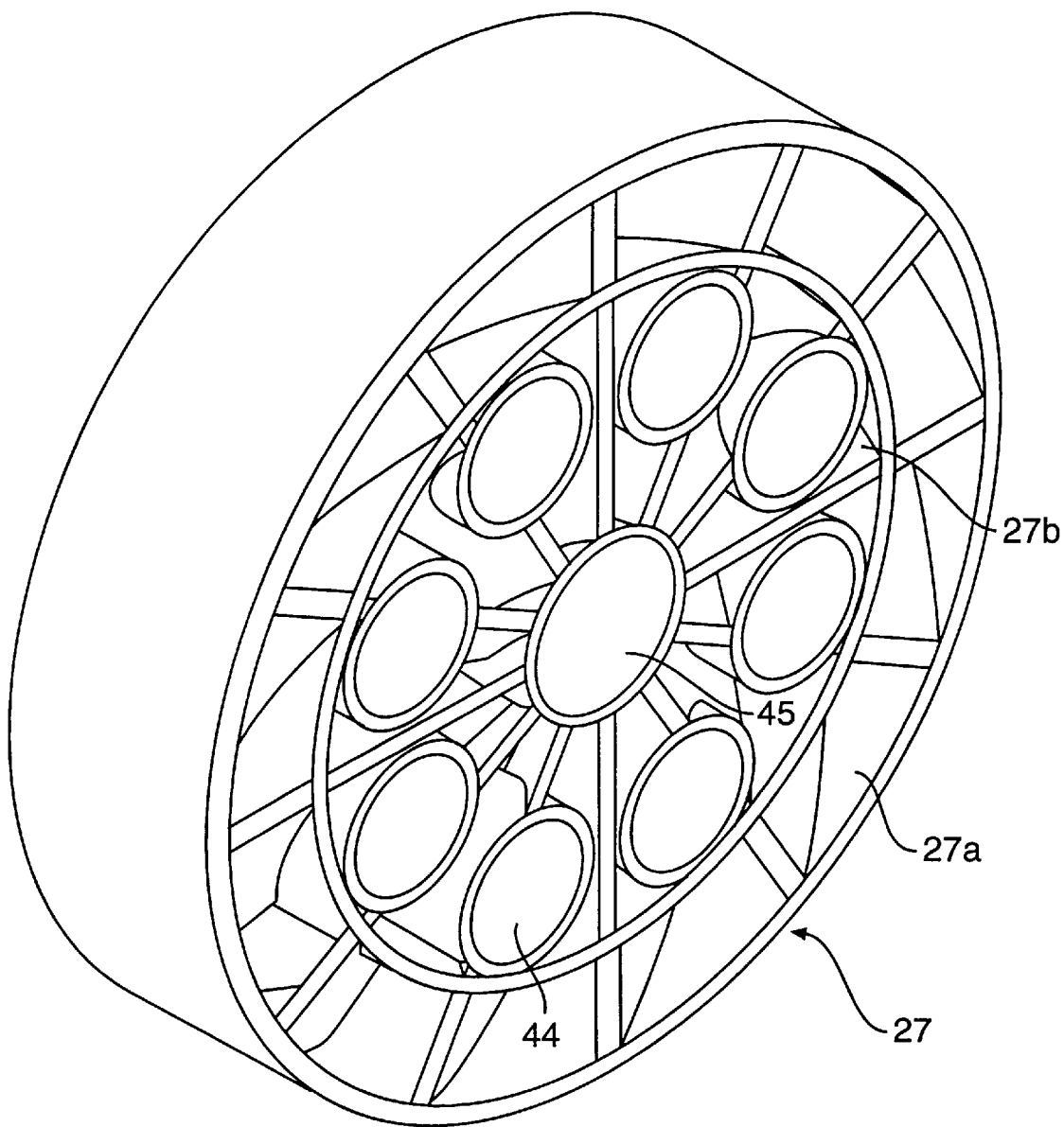
FIG. 7 shows the primary air swirler installed in the burner of FIG. 2.

Close to the outlet section of primary air duct 6 a fixed swirler 27 is provided which, as shown in greater detail in FIG. 7, is divided into two concentric annular areas equipped with blades set at different angles on inner row 27a and outer row 27b and having special passages for gas lances 23, as well as a central passage 45 for oil lance 43.

The performance of the burner in the oil-gas version according to the present invention has been compared with that of the burner according to European patent No. 452608 and with a reference "PARALLEL FLOW" burner in the following operating conditions: 40 MWt, use of oil No. 6 with organic nitrogen 0.45%.

Figure 8:
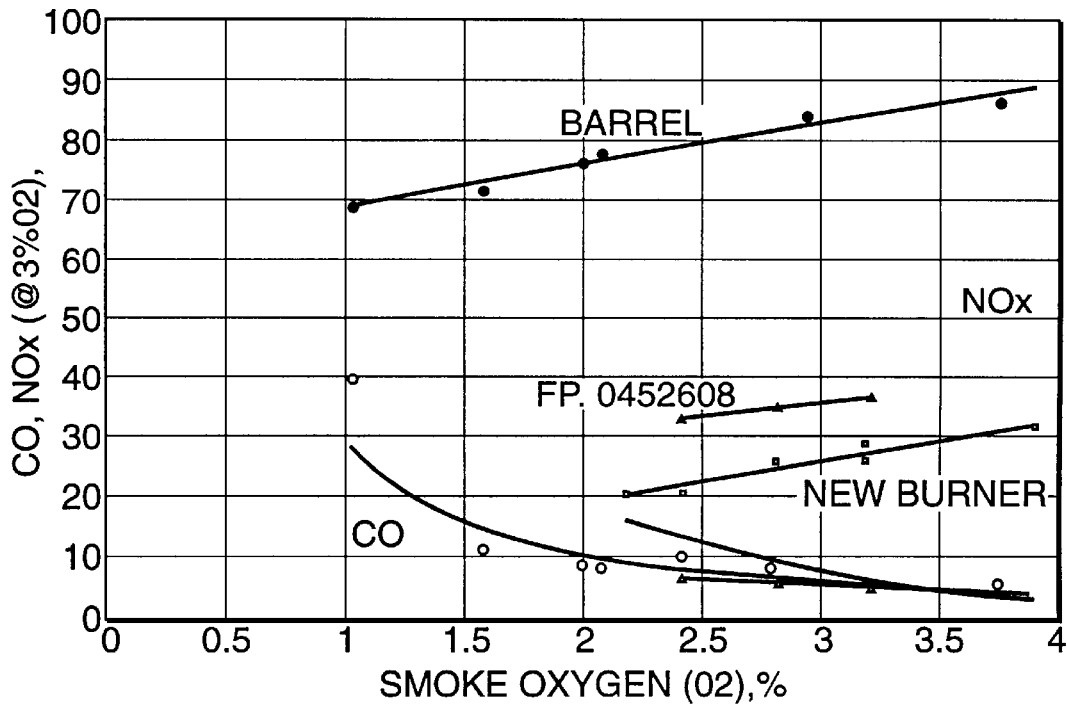
FIGS. 8 and 9 are diagrams illustrating the performance (CO-NOx and AP) of the burner of FIG. 2 as compared with burners known to the art.
Figure 9:
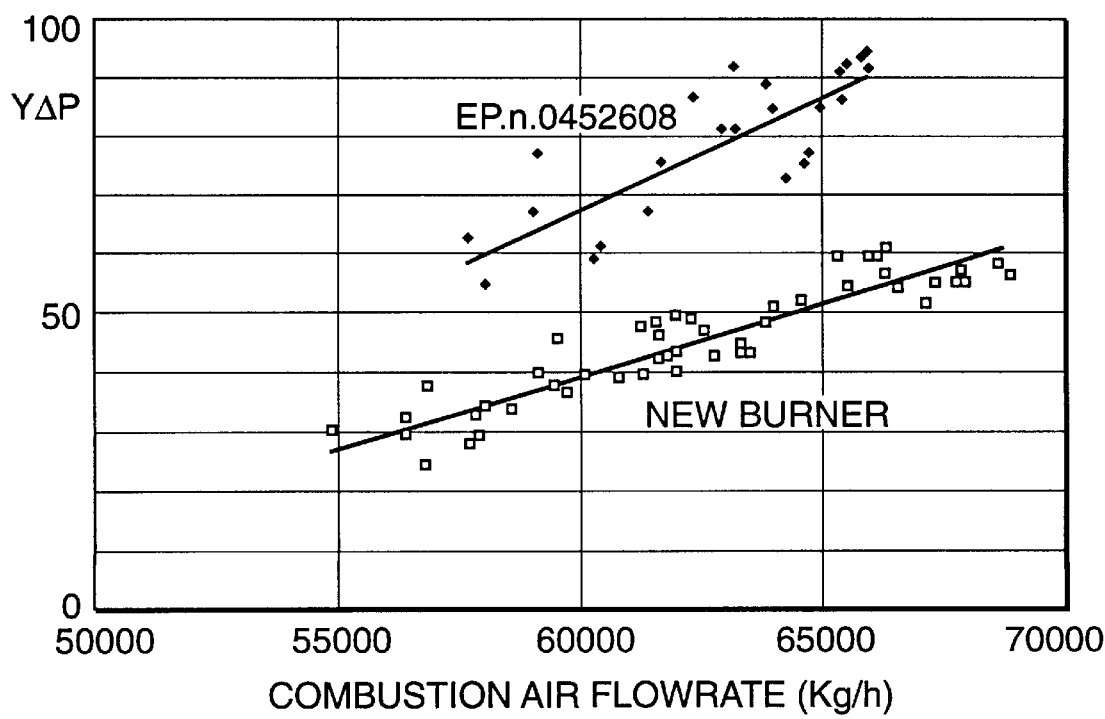

FIG. 8 shows, in arbitrary units, the nitrogen oxide and CO emissions in the three cases, as a function of the percentage of oxygen in the smoke, whereas FIG. 9 shows, again in arbitrary units of measurement, the values for pressure drop versus the combustion air flow rate, measured between windbox 5 and combustion chamber 2 in the case of the burner according to the invention and of the one according to European patent 0452608.

From the tests carried out the following results have been obtained:

- a reduction in NOx emissions of about 65% without negatively affecting the smoke point, when oil is burnt;
- a reduction in the NOx emissions of the same extent, when gas is burnt;
- a reduction of over 30% in pressure drop between the windbox and the combustion chamber;
- the ability to associate the burner with any type of atomizer device, whether steam or mechanically driven;
- the ability to obtain concentric combustion (oil +gas) in the whole range of possible variations in the ratio of both fuel;
- the possibility to carry out the concentric combustion (oil plus gas) in all the variation range of both fuel;
- a significant simplification of the construction, mainly due to the presence of a single actuator for intercepting the combustion air and the elimination of all movements involving gears.

Figure 3:
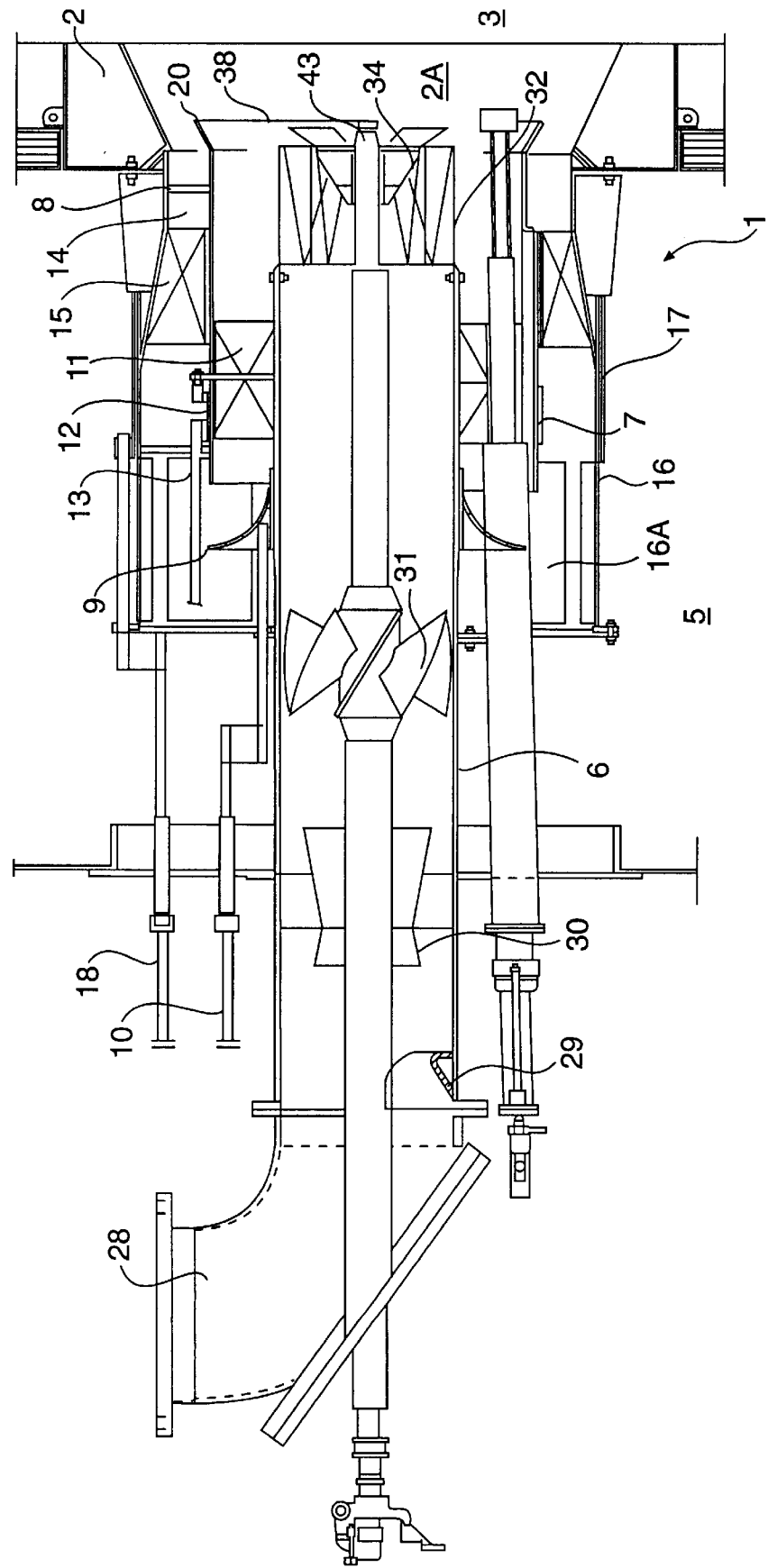
FIG. 3 is a longitudinal section view of the oil-coal version of the burner according to the invention.

FIG. 3 shows a longitudinal section of the oil-coal version of the burner assembly. The mixture of coal dust and carrier air is fed into the central duct of burner 6 through a coal dust transport pipe from a mill, not shown. In the figure the most common solution of guide means is shown in the form of an elbow joint 28. Just downstream from the inlet there is a deflecting wall 29 which has the job of contrasting the tendency of the coal dust mixture to collect in layers on the outside of the bend.

A Venturi-type diffuser 30 having the job of rendering the mixture homogeneous is arranged after wall 29, and then a fixed swirler 31 is provided to give the mixture a rotational movement such as to spin the coal dust towards the wall of primary duct 6.

The concentrated coal dust is then injected into combustion chamber 2 through a nozzle 32 for coal-air mixtures, positioned at the outlet of duct 6. Nozzle 32 can be of any conventional type, but in a particularly preferred embodiment of the invention it is of the type disclosed in a copending US application in the name of the same Applicants and shown in FIGS. 10 and 11.

Figure 10:
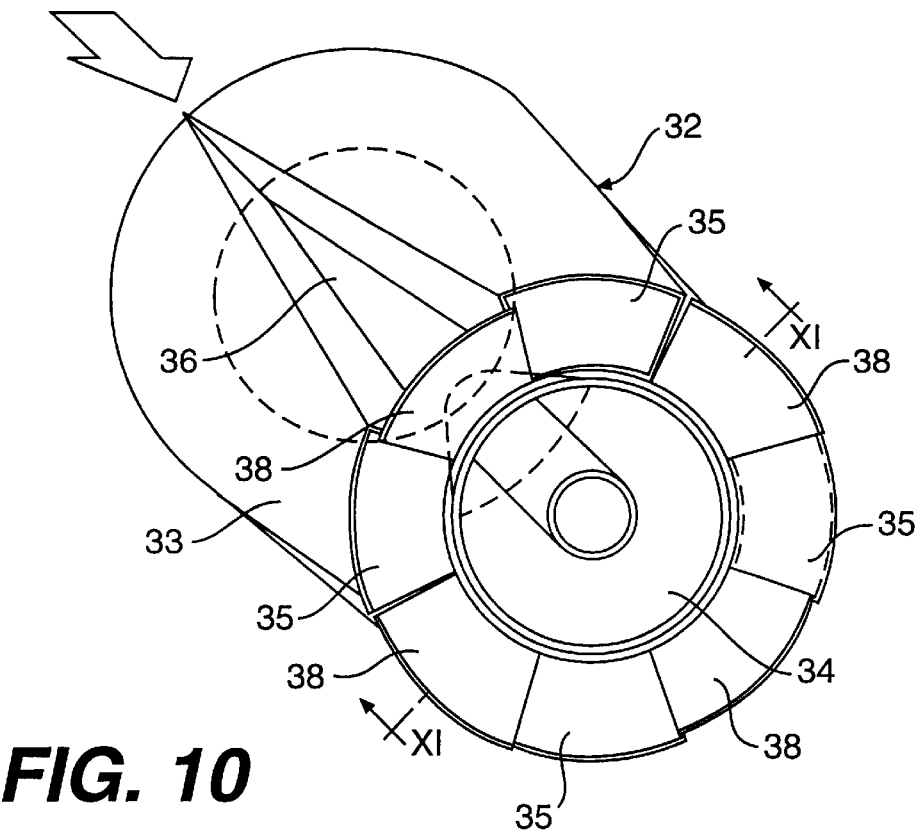
FIG. 10 is a perspective view of a nozzle for coal/air mixtures according to the present invention.
Figure 11:
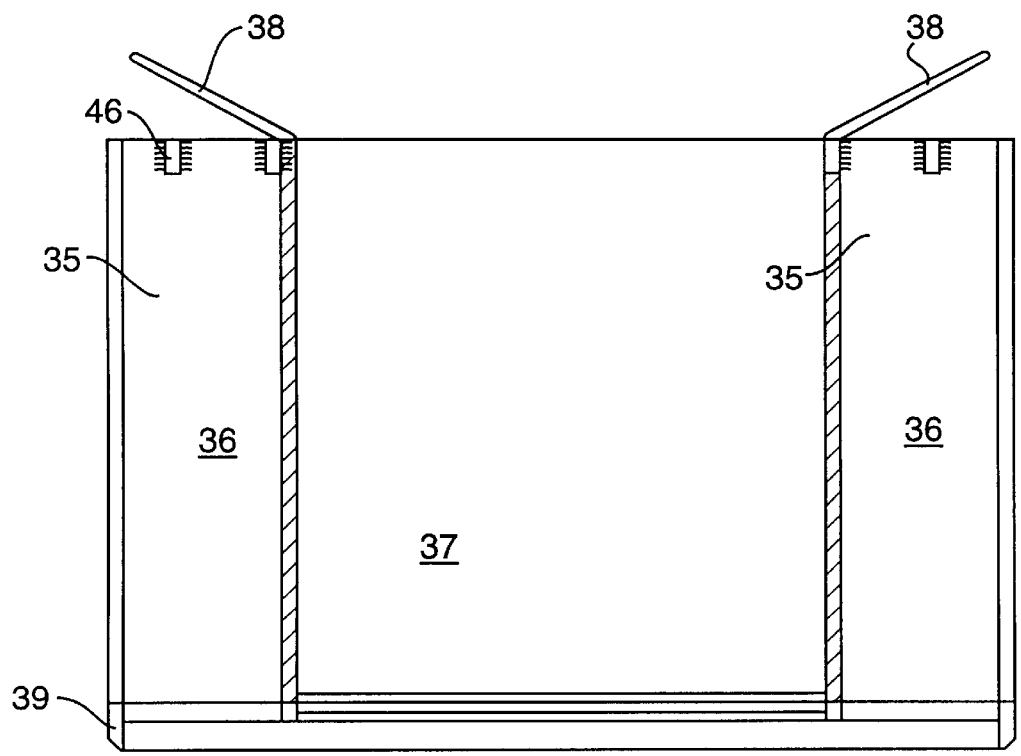
FIG. 11 is a partial cross-sectional view of the nozzle of FIG. 10 taken along arrows XI–XI.

With reference to FIGS. 10 and 11, nozzle 32 is made up of a stationary part 33 which serves the purpose of concentrating the coal dust into physically separated streams, and a mobile member 34 which serves the purpose of registering the outflow of primary and combustion air according to the manner in which the desired combustion process is to be carried out.

The stationary part 33 consists of a group of at least three ducts 35 with the shape of a truncated cone converging towards the combustion chamber 2, arranged around an annulus coaxial with duct 6 and oil lance 43, so as to transform 100% of the annulus section at the inlet into 40—60 % of the section at the outlet. As an example, in FIG. 10 an embodiment with four ducts 35 is shown. In this way the coal dust, which is already concentrated towards the wall of primary air duct by swirler 31, is divided into various streams with a low air/coal ratio. Between coal ducts 35 air ducts 36 are formed having a section which increases towards combustion chamber 2. Therefore, at the nozzle outlet, the outlet ports of air ducts 36 in this way alternate with those of ducts 35.

The mobile member 34, coaxial with the oil lance, has a conical cup shape and can be displaced between two end positions and a plurality of intermediate positions, as it is slidingly mounted thereon and is moved by means of a rod, not shown, along inner duct.

The primary air transporting the coal dust reaches the nozzle, as stated above, with a coal dust rich stream at the periphery of the air duct and a coal dust poor stream at the centre. The coal dust rich stream enters ducts 35 of stationary part 33 of the nozzle, while the coal dust poor stream, flowing through the central section of primary air duct of the burner, enter inner duct 37 and is divided in two sub-streams depending on the position of mobile member of the nozzle. A first sub-stream flows through air ducts 36 and the second one is directed toward the outlet of inner duct 37 and fed to the combustion chamber through the passage defined by the outlet end of inner duct 37 and mobile member 34 of the nozzle coaxial thereon. Inclined plates 38 are positioned at the nozzle outlet in correspondence with the outlets from air ducts 36.

Inclined plates have the aim of deflecting the primary air, poor in coal dust, radially away from the centre for mixing it with the secondary air, and have an inclination of between 0° and 45°, optionally adjustable in a known manner by means of a control rod, not shown.

In an embodiment illustrated in FIG. 11, given as an example, ducts 35 for the air-coal mixture are tubular sectors of an annulus with a cross section that decreases from the inlet to the outlet, which are welded at their inlet end to a support 39 made up of two concentric annular members connected by radial arms not shown, while at their outlet ends ducts 35 are connected by means of circumferential tie rods 46 which give adequate allowance for thermal dilation.

The composition of the two-phase mixture at the burner outlet depends upon performance of the process of mixing the air poor in coal dust and the coal dust rich streams, this composition being the basic parameter for control of emission of NOx, unburned fuel and flame stability.

According to the present invention, by suitably combining the position of mobile member 34 with the effect of the stationary part 33 it is possible to define an optimum solution to respond to the various requirements of different installations.

With mobile member 34 a long way back the flame is longer, the combustion process is slow, so that NOx is minimum, but CO and unburned fuel are maximum.

With mobile member 34 a long way forward, combustion is intense and localized, due to the high level of coal dust/air mixing, NOx are maximum, CO and unburned products minimum.

The embodiment shown in FIG. 3, which has been tested at full scale, has underlined the following performances:
- a NOx reduction in the order of 50%, when oil and coal are burnt, as compared with traditional "CIRCULAR" type burners;
- during coal fuelling a reduction in the level of unburned products in the order of 50%, as compared with first generation "Low NOx" burners;
- in all cases there was always a reduction in the pressure drop of about 30%, again as compared with first generation "Low NOx" burners, due to the construction of the secondary and tertiary air registers.

Figure 4:
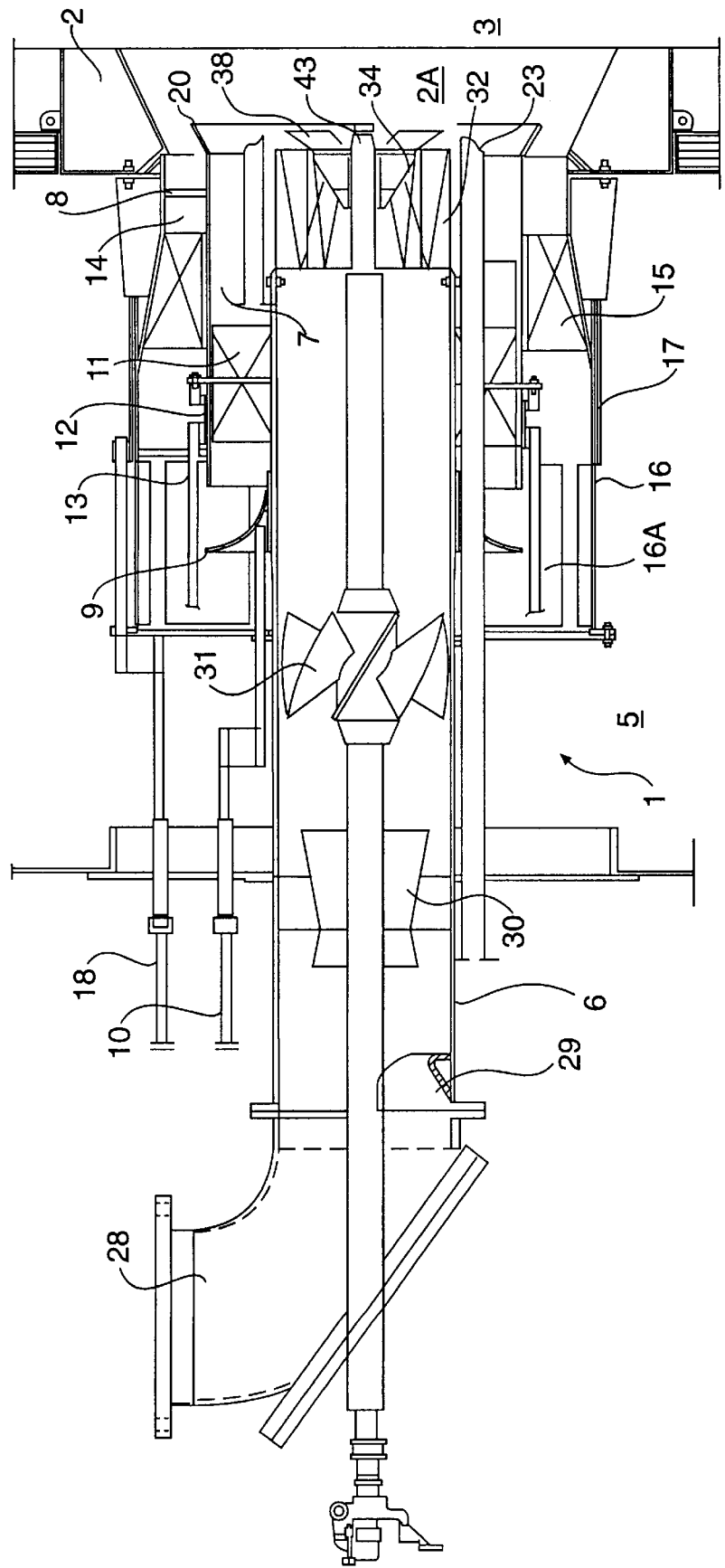
FIG. 4 is a longitudinal section view of the oil-gas-coal version of the burner according to the invention.

A burner according to the invention suitable for use with both solid, liquid and gaseous fuels, either alone or in a combination of oil and gas, is illustrated in FIG. 4. This burner differs from the one illustrated in FIG. 3 essentially in the fact that a row of gas lances 23 is provided, arranged around nozzle 32 for injection of the air-coal mixture, said lances being arranged in duct 7 for secondary air. This arrangement, which is made possible by the configuration of the secondary and tertiary air registers according to the invention, allows gas lances 23 to be kept in a fixed position even during coal combustion, unlike conventional low NOx burners in which each lance is equipped with a pneumatic actuator, to withdraw it during coal firing because of problems of cooling and wear.

In a special embodiment of the burner of FIG. 4 a pair of gas lances 23 is provided for each duct 35 for the air-coal mixture of nozzle 32, arranged for example at the two ends of the outlet of said duct.

Variations and/or modifications can be made to the three stage low NOx burner capable of burning solid, liquid and gaseous fuels according to the present invention, without departing from the scope of protection of the invention itself, as defined in the appended claims.

We claim:

1. A low Nox burner comprising ducts for the primary, secondary and tertiary air, arranged coaxially around its longitudinal axis, for supplying primary, secondary and tertiary air, respectively to a combustion chamber, means for accumulation of the air, means to give vorticity to the primary, secondary and tertiary air installed in the respective ducts, fuel supply means arranged within said ducts to inject the fuel into said combustion chamber, said means for giving vorticity to the secondary air comprising an axial swirler for the secondary air, formed by a plurality of blades each of which is made up of a fixed part and a mobile part connected to actuator means capable of angularly displacing said mobile part to give an air duct outlet angle between 30° and 60°, and ,means for giving vorticity to the tertiary air comprising an axial swirler for the tertiary air, in the shape of a cone and with fixed blades, a passage being formed on the tertiary air duct to feed the secondary air and the tertiary air.

2. The burner according to claim 1, in which said means for actuating said mobile part of said axial swirler for the secondary air comprise an annular element slidingly mounted on the secondary air duct and integral with a rod to slide it along said secondary air duct, the mobile part of each blade of said swirler being integral with a respective arm, pivotally connected to a respective tie rod extending axially from said annular element.

3. The burner according to claim 1, in which said means for giving vorticity to the primary air comprises an axial swirler (27) for the primary air formed by two concentric rows of stationary blades, said row having a different inclination from the longitudinal axis and being arranged close to the outlet of said primary air duct.

4. The burner according to claim 3, in which the passage formed on the tertiary air duct also supplies the primary air fed to the primary air duct through an interceptable passage formed thereon.

5. The burner according to claim 1, in which said fuel supply means comprise a lance for liquid fuel, coaxial with the primary air duct and a row of gas lances around it, said liquid fuel and gas lances being arranged inside said primary air duct.

6. The burner according to claim 2, in which said fuel supply means comprise a lance for liquid fuel arranged coaxial to the primary air duct and inside it, and a nozzle for injection of a mixture of air and coal dust, positioned at the outlet of said primary air duct and made up of a fixed stationary portion divided into ducts of a circumferential width that decreases towards the outlet of the duct to form jets of coal dust rich air stream, and a central portion that is axially mobile within said nozzle, capable of varying the section of a central passage of the nozzle, formed by said stationary annular portion, there being formed between two adjacent ducts in said stationary annular portion respective ducts for formation of a jet of a coal dust poor air stream, with an increasing circumferential width, deflector ,means for said air stream poor in coal dust being provided at the outlet from said ducts to direct the jets of said air stream poor in coal dust in a direction that diverges from the longitudinal axis.

7. The burner according to claim 6, in which the inclination of said deflector means can be adjusted within an interval of between 45° and 90° with respect to the longitudinal axis.

8. The burner according to claim 7, in which the overall section for passage of said ducts for the mixture rich in coal dust at the inlet of said nozzle is substantially equivalent to 100% of the section at the inlet of said stationary annular portion, whereas the overall section of the passage of said ducts at the outlet of said fixed annular portion is equal to 40—60% the outlet section thereof.

9. The burner according to claim 6, in which said ducts for the air stream rich in coal dust are axially fixed at their inlet ends to a support formed by two concentric annular members connected to each other and radially spaced at a distance substantially equal to the radius of said ducts, said ducts being connected together by means of circumferential tie rods at their outlet ends.

10. The burner according to claim 6, in which within said secondary air duct fixed gas lances are fitted, arranged around said nozzle.

11. The burner according to claim 6, in which at the outside of each duct for the mixture rich in coal dust at least one pair of said gas lances is provided.

* * * * *

UNITED STATES PATENT AND TRADEMARK OFFICE
CERTIFICATE OF CORRECTION

PATENT NO. : 5,823,764
DATED : October 20, 1998
INVENTORS : Marco ALBERTI, Roberto RIZZI, Marcello MARTANO, Gennaro DE MICHELE, and Sergio LIGASACCHI It is certified that error appears in the above-identified patent and that said Letters Patent is hereby corrected as shown below:

Title page, item [75], line 4 under "Inventors", "S. Ciuliano Terme" should read -- S. Giuliano Terme --
Claim 1, col. 7, line 50, "Nox" should read --NOx--;
Claim 1, col. 7, line 63, "and ,means" should read --said means--;
Claim 6, col. 8, line 33, "nozzle, formed by" should read --nozzle formed by--;
Claim 6, col. 8, line 37, "deflector ,means" should read --deflector means--.

Signed and Sealed this

Sixteenth Day of February, 1999

Attest:

*Acting Commissioner of Patents and Trademarks*

*Attesting Officer*